(12) United States Patent
Meincke (10) Patent No.: US 7,606,354 B2
(45) Date of Patent: Oct. 20, 2009

(54) METHOD AND SYSTEM FOR DYNAMIC TARIFFING AND BILLING

(75) Inventor: Wilhelm Werner Meincke, Ratingen (DE)

(73) Assignee: Koninklijke KPN N.V., The Hague (NL)

( * ) Notice: Subject to any disclaimer, the term of this patent is extended or adjusted under 35 U.S.C. 154(b) by 504 days.

(21) Appl. No.: 10/585,840

(22) PCT Filed: Jan. 31, 2005

(86) PCT No.: PCT/EP2005/000998

§ 371 (c)(1),
(2), (4) Date: Jul. 12, 2006

(87) PCT Pub. No.: WO2005/076589

PCT Pub. Date: Aug. 18, 2005

(65) Prior Publication Data

US 2008/0170675 A1    Jul. 17, 2008

Related U.S. Application Data

(60) Provisional application No. 60/540,418, filed on Jan. 30, 2004.

(51) Int. Cl.
*H04M 15/00* (2006.01)
*H04M 11/00* (2006.01)

(52) U.S. Cl. ............... 379/114.03; 379/114.1; 379/114.2; 455/406

(58) Field of Classification Search ............ 379/114.01, 379/114.03, 114.05, 114.17, 114.1, 114.2, 379/114.28, 116, 121.02, 121.03, 121.04, 379/125, 126, 127.04; 455/405–408
See application file for complete search history.

(56) References Cited

U.S. PATENT DOCUMENTS

| 5,991,378 | A | 11/1999 | Apel et al. |
| 6,085,179 | A | 7/2000 | Halm et al. |
| 7,436,942 | B2 * | 10/2008 | Hakala et al. .......... 379/114.22 |
| 2002/0068546 | A1 * | 6/2002 | Plush et al. ................. 455/406 |
| 2006/0058010 | A1 * | 3/2006 | Williams et al. ......... 455/414.1 |

FOREIGN PATENT DOCUMENTS

| JP | 2002335328 | 11/2002 |
| WO | WO 97/31472 A3 | 8/1997 |
| WO | WO-02/51118 A | 6/2002 |

* cited by examiner

*Primary Examiner*—Quoc D Tran
(74) *Attorney, Agent, or Firm*—McDonnell Boehnen Hulbert & Berghoff LLP (57) ABSTRACT

A method and a system for dynamic tariffing and billing where tariffs of telecommunication services are adapted based on the usage of telecommunication services between members of a group account.

18 Claims, 3 Drawing Sheets

METHOD AND SYSTEM FOR DYNAMIC TARIFFING AND BILLING

FIELD OF THE INVENTION

The invention relates to a method and a system for dynamic tariffing and billing. More specifically the invention relates to adapting tariffs of telecommunication services based on the usage of telecommunication services between members of a group account.

BACKGROUND OF THE INVENTION

Telecommunication is possible in many ways. One can use a telephone to make phone calls to other telephones. Various technologies exist to make such phone calls, like fixed telephony, mobile telephony or Internet telephony. Tariffs for making phone calls can differ per technology, can be geographically defined and can vary per type of service. National phone calls tend to be cheaper than international phone calls for example and special service numbers (e.g. directory services) tend to be more expensive than normal telephone numbers. Besides making phone calls it is possible to send and retrieve messages via various devices and formats, like e.g. SMS messages with mobile or fixed telephones, MMS messages with mobile phones, email messages with smart phones, etcetera. Again tariffs can differ per technology and geographical destination and can be different for the various formats.

Telecommunication providers define the tariffs. Systems within the telecommunication networks detect the kind of communication used and the geographical destination and send this information to billing systems where usage and tariffs are combined to create bills for the end-user. A telephone billing system for real-time automatic detection of the best bill and of the best bill profile of a user on the basis of any number of tariff plans is known from EP1035724. It produces a telephone bill, intended as lowest-value bill, by analyzing the tariff plans configured in the system and basing its own economic processing both with respect to physical parameters like time (time-based, time duration), number (calling number, called number), zone (original zone, destination zone), typology (information type), transmission media (transmission media type) as well as with respect to aggregated configurations as friend-and-family service, "user group", "closed user group", "large account", in observance of the logics adopted for the configuration of the tariff plans adopted by the telephone company. In short EP1035724 can analyze from the economical point of view the user profile and is capable of indicating the optimal tariff plan to the user. It also migrates a user automatically from a tariff plan to another so as to minimize the amount of the bill.

A problem of the known billing system is its complexity. Moreover it does not provide a solution for adapting tariffs of telecommunication services based on the usage of telecommunication services between members of a group account.

Problem Definition

Existing tariffing and billing methods and systems are not capable of dynamically adapting tariffs of telecommunication services based on the usage of telecommunication services between members of a group account.

Aim of the Invention

It is the aim of the invention to enhance existing tariffing and billing methods and systems to enable dynamically adapting tariffs of telecommunication services based on the usage of telecommunication services between members of a group account.

SUMMARY OF THE INVENTION

The present invention provides a solution for enhancing existing tariffing and billing methods and systems to enable dynamically adapting tariffs of telecommunication services based on the usage of telecommunication services between members of a group account.

According to an aspect of the invention a system is provided for dynamic tariffing and billing, the system comprising a Service Handler part (1) for controlling the dynamic tariffing and billing, a Data part (2) for storing information and a Rating part (3) for making calculations, the Service Handler part (1) being linked to the Data part (2) via a first interface (1) and to the Rating part (3) via a second interface (13).

The Data part (2) can comprise a database (21) for storing an account value indicating a tariff. This tariff indicates the tariff that advantageously will be used for billing the first type of telecommunication services. The database can furthermore store at least two types of telecommunication services, a first type of telecommunication services indicating one or more telecommunication services that decrease the account value, and a second type of telecommunication services indicating one or more telecommunication services that increase the account value. The database can furthermore store a ruleset for mapping a telecommunication service on a value by which the account value is to be decreased or increased. This advantageously enables different telecommunication services to have different impact on the tariff. The database can furthermore store a list of subscribers that belong to the same group. This information advantageously enables the system to have subscribers influence each others tariff.

The Service Handler part (1) can be arranged to detect a usage of the telecommunication service. It can furthermore be arranged to retrieve data from the Data part (2) and send the data to the Rating part (3) for calculating a new account value. It can receive the new account value from the Rating part (3) and send the new account value to the Data part (1) to overwrite the account value. This advantageously enables the system to update the tariff based on the usage of telecommunication services by a subscriber.

The system can further comprise a Provisioning part (4) that is linked to the Service Handler part (1) via a third interface (14), the Provisioning part (4) comprising a first external interface (41) for sending and/or receiving provisioning data to a legacy system. This advantageously enables the system to update a legacy system with information from the system or to update information in the Data part (2) with information from a legacy system.

The system can further comprise a User Access part (5) that is linked to the Service Handler part (1) via a fourth interface (15), the User Access part (5) comprising a second external interface (51) for providing access to the system to a subscriber. This advantageously enables the information in the Data part (2) of the system to be updated by a subscriber.

The system can further comprise a User Info part (6) that is linked to the Service Handler part (1) via a fifth interface (16), the User Info part (6) comprising a third external interface (61) for sending subscription information to a subscriber. This advantageously enables the system to inform a subscriber about the status of the subscription.

The system can further comprise a Service Provider Access part (7) that is linked to the Service Handler part (1) via a sixth interface (17), the Service Provider Access part (9) comprising a fourth external interface (71) for providing access to the system to a service provider. This advantageously enables the information in the Data part (2) of the system to be updated by a service provider.

The system can further comprise a Billing Interface part (8) that is linked to the Service Handler part (1) via a seventh interface (18), the Billing Interface part (8) comprising a fifth external interface (81) for sending billing information to a service provider. This advantageously enables the system to create billing information using the actual tariff, enabling the service provider to bill the subscriber using the actual tariff.

The system can further comprise a Service Access Control part (9) that is linked to the Service Handler part (1) via a eighth interface (19), the Service Access Control part (9) comprising a sixth external interface (91) for detecting usage of the telecommunication service. The Service Access Control part (9) can be arranged to send detecting information to the Service Handler part (1), which activated the calculation of the new tariff. This advantageously enables the system to detect any kind of usage of telecommunication services.

According to another aspect of the invention a method is provided for dynamic tariffing and billing in a system comprising a Service Handler part (1) for controlling the dynamic tariffing and billing, a Data part (2) for storing information and a Rating part (3) for making calculations, the Service Handler part (1) being linked to the Data part (2) via a first interface (1) and to the Rating part (3) via a second interface (13).

The method can comprise the step of storing in a database (21) of the Data part (2) an account value indicating a tariff. This tariff indicates the tariff that advantageously will be used for billing the first type of telecommunication services. The method can further comprise the step of storing in the database at least two types of telecommunication services, a first type of telecommunication services indicating one or more telecommunication services that decrease the account value, and a second type of telecommunication services indicating one or more telecommunication services that increase the account value. The method can further comprise the step of storing in the database a rule-set for mapping a telecommunication service on a value by which the account value is to be decreased or increased. This advantageously enables different telecommunication services to have different impact on the tariff. The method can further comprise the step of storing in the database a list of subscribers that belong to the same group. This information advantageously enables the system to have subscribers influence each others tariff.

The method can comprise the step of detecting in the Service Handler part (1) a usage of the telecommunication service. It can furthermore comprise the steps of retrieving in the Service Handler part (1) data from the Data part (2), sending the data to the Rating part (3), calculating in the Rating part (3) a new account value, receiving in the Service Handler part (1) the new account value from the Rating part (3), sending the new account value from the Service Handler part (1) to the Data part (1), and overwriting the account value with the new account value in the database (21). This advantageously enables the system to update the tariff based on the usage of telecommunication services by a subscriber.

The system can further comprise a Provisioning part (4) that is linked to the Service Handler part (1) via a third interface (14), the Provisioning part (4) comprising a first external interface (41), and the method can further comprise the step of sending and/or receiving provisioning data to a legacy system via the first external interface (41). This advantageously enables the system to update a legacy system with information from the system or to update information in the Data part (2) with information from a legacy system.

The system can further comprise a User Access part (5) that is linked to the Service Handler part (1) via a fourth interface (15), the User Access part (5) comprising a second external interface (51), and the method can further comprise the step of providing access to the system to a subscriber via the second external interface (51). This advantageously enables the information in the Data part (2) of the system to be updated by a subscriber.

The system can further comprise a User Info part (6) that is linked to the Service Handler part (1) via a fifth interface (16), the User Info part (6) comprising a third external interface (61), and the method can further comprise the step of sending subscription information to a subscriber via the third external interface (61). This advantageously enables the system to inform a subscriber about the status of the subscription.

The system can further comprise a Service Provider Access part (7) that is linked to the Service Handler part (1) via a sixth interface (17), the Service Provider Access part (9) comprising a fourth external interface (71), and the method can further comprise the step of providing access to the system to a service provider via the fourth external interface (71). This advantageously enables the information in the Data part (2) of the system to be updated by a service provider.

The system can further comprise a Billing Interface part (8) that is linked to the Service Handler part (1) via a seventh interface (18), the Billing Interface part (8) comprising a fifth external interface (81), and the method can further comprise the step of sending billing information to a service provider via the fifth external interface (81). This advantageously enables the system to create billing information using the actual tariff, enabling the service provider to bill the subscriber using the actual tariff.

The system can further comprise a Service Access Control part (9) that is linked to the Service Handler part (1) via a eighth interface (19), the Service Access Control part (9) comprising a sixth external interface (91), and the method can further comprise the steps of detecting usage of the telecommunication service via the sixth external interface (91), and sending detecting information from the Service Access Control part (9) to the Service Handler part (1). This advantageously enables the system to detect any kind of usage of telecommunication services.

BRIEF DESCRIPTION OF THE DRAWINGS

The invention will be explained in greater detail by reference to exemplary embodiments shown in the drawings, in which.

DETAILED DESCRIPTION OF THE INVENTION

For the purpose of teaching of the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

General

The invention is a self-administrated real time Group/Partner Account to offer low-priced usage of basic telecommunication services between the partners/group members, in the following called "Partner/Group Account Service".

The "Partner/Group Account Service" provides basically a common account (called "Partner/Group Account" in this description) for members of a certain group of telecommunication subscribers of a GSM Network. A group may be a small group of people, e.g. a group of two members, which is called a partnership. A group may also be a larger group of people, e.g. all subscribers of a GSM Network. Other groups can be defined.

Figure 1:
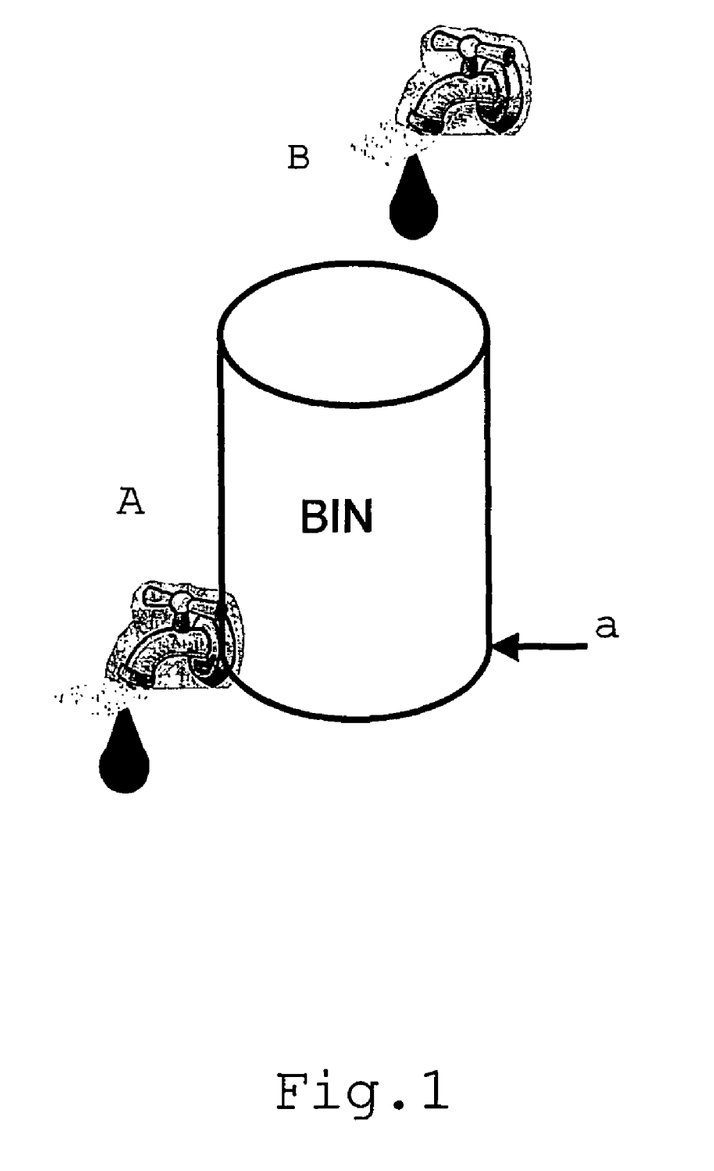
FIG. 1 shows a visualization of an aspect of the invention.

The fundamental function of the Partner/Group Account is described based on FIG. 1. In FIG. 1 the usage of telecommunication services is visualized by water drops from water taps filling and emptying a bin, the bin being a visualization of an amount of usage of telecommunication services. The water taps, water bin and water are of course only used for explanatory purposes. The invention does not use water taps, water bins or water.

The bin (BIN) can be filled by the top water tap (B), which represents the usage of a certain basic telecommunication service "B" like e.g. incoming calls from the fixed network to the members of the group. The lower water tap (A) represents another basic telecommunication service "A" like e.g. voice calls between the members of a group. The sensor (a) identifies the status of the bin: "empty" or "not empty". If the status is "not empty" the calls between the group members will be charged with a special price for example for free. If the status is "empty" these calls will be charged to the normal rate.

The modification of the Partner/Group Account will be performed in real time therefore the users are already in the position to know the current price for the basic telecommunication services.

Figure 2:
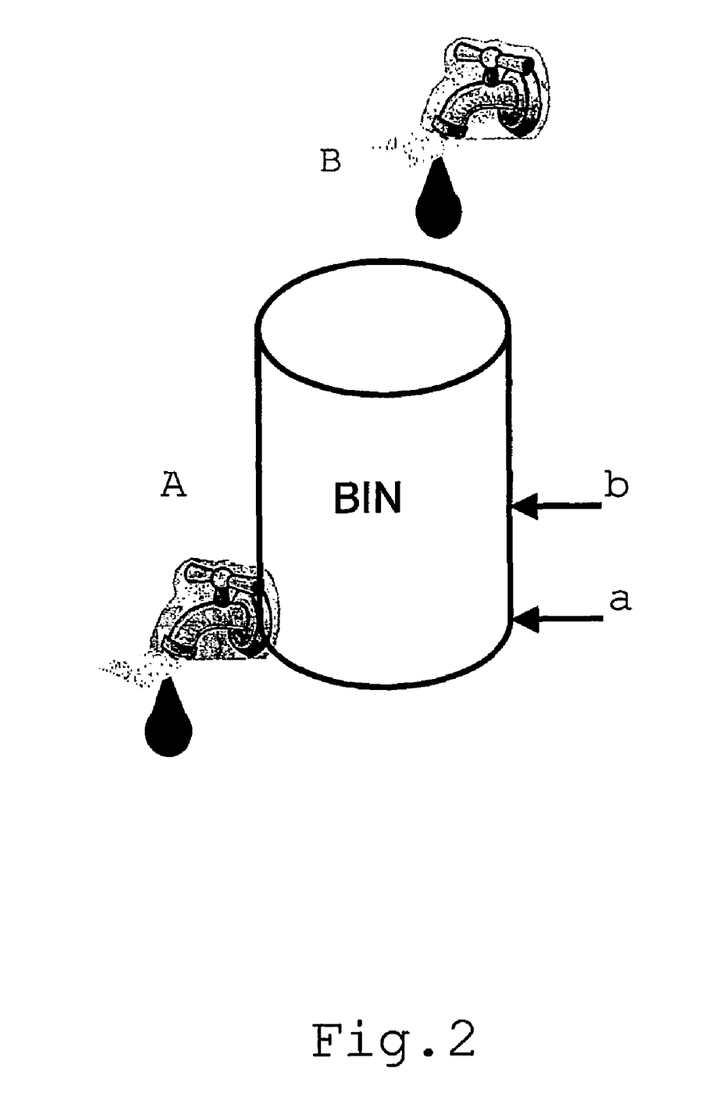
FIG. 2 shows another visualization of an aspect of the invention.

The bin (BIN) can be configured with a second sensor. This is shown in FIG. 2 as the second sensor (b). The second sensor is used to avoid frequent oscillations between normal price and special price, if the status changes between "empty" and "not empty" have a direct impact to the price. Table 1 shows an example of the relation between the status of the sensors and the price of the basic telecommunication service type "A".

TABLE 1 mapping sensor status to price

| Sensor (a) status | Sensor (b) status | Price |
|---|---|---|
| Empty | Empty | Normal |
| Not empty | Empty | Normal |
| Not empty | Not empty | Special |
| Not empty | Empty | Special |
| Empty | Empty | Normal |

The representation of the content of the bin can be derived from the characteristics of the basic telecommunication services (e.g. minutes of voice calls, numbers of SMS in case of the Short Messages Services, etcetera) or can be mapped in units whereas the unit is the smallest countable item of the Partner/Group Account.

An example of a plane mapping is given in the following tables (Table 2 and Table 3). The basic telecommunication service type "A" decreases the Partner/Group Account and is in the normal case the subject for the special offer, the basic telecommunication service type "B" increases the Partner/Group Account.

TABLE 2 mapping units to basic telecommunication service of type "A"

| | Basic telecommunication services, Type "A" | Mapping to units |
|---|---|---|
| 1 | Voice calls between members of a group | 1 minute = 1 unit |
| 2 | SMS between members of a group | 1 SMS = 1 unit |
| 3 | MMS between members of a group | 1 MMS = 3 units |

TABLE 3 mapping units to basic telecommunication service of type "B"

| | Basic telecommunication services, Type "B" | Mapping to units |
|---|---|---|
| 1 | Incoming voice call from the fixed network to one member of the group | 1 minute = 1 unit |
| 2 | International call of a group member | 1 minute = 2 unit |

This mapping can be replaced by any mathematical function between the basic telecommunication service characteristics and the units.

Overview of the "Partner/Group Account Service" System

Figure 3:
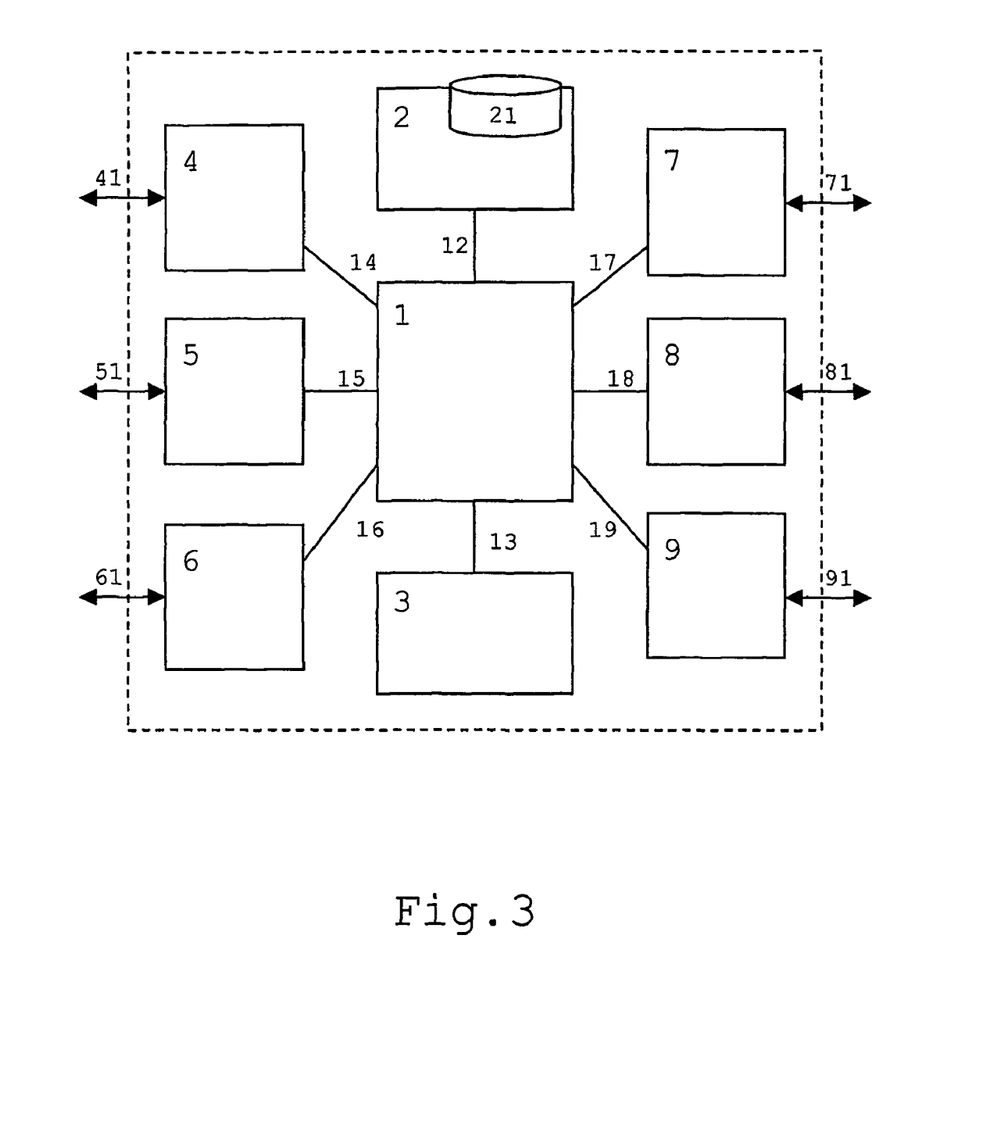
FIG. 3 shows a system according to an aspect of the invention.

The functionality to provide the "Partner/Group Account Service" can be divided in functional components as depicted in FIG. 3. The parts indicated by (1), (2) and (3) provide the generic functionality whereas the parts (4), (5), (6), (7), (8) and (9) cover the aspects for the integration of the service in the administration, billing, customer care and network infrastructure of the Network Operator or the Service Provider.

The first part is the Partner/Group Service Handler part (1). The Partner/Group Service Handler part (1) is the central functional module in the arrangement of the other parts of the "Partner/Group Account Service". This part (1) is responsible for tasks like service like life cycle and user status calculation, the manipulation of the partner/group account, receiving events and parameters, fetches the data from the Data part (2), involves the Rating part (3), computes the new data.

The second part is the Data part (2). The Data part (2) contains the configuration data of the service, like:

Basic telecommunication services type "B", which increase the Partner/Group Account;

Basic telecommunication services type "A", which decrease the Partner/Group Account;

Tariff data/mapping rules;

Life cycle model data;

Maximum of group members;

Etcetera.

It also contains the individual group data, like:

Partner/group identification;

Partner/Group Account;

MSISDN of the group members;

Life cycle status;

Subscription information of the users (e.g. post paid or prepaid;

Status of the group members;

Etcetera.

The third part is the Rating part (3). The Rating part (3) calculates the relation between the basic telecommunication services and their representation in units especially in case of complex relationships.

The fourth part is the Provisioning part (4). The Provisioning part (4) sends provisioning data to legacy systems (e.g. which allows the setting of triggers in a HLR database) or receives provisioning data from legacy provisioning systems (e.g. deactivation of a subscription of a certain MSISDN or exchanging of MSISDN of group members).

The fifth part is the User Access part (5). The User Access part (5) contains mainly the menu for the self-administration of the service and for access to the information of the status of the service (e.g. current value of the partner/group account, member status).

The sixth part is the User Info part (6). The User Info part (6) sends information about defined status modifications to the group members like "Partner/Group Account is empty", "new member entered", "bonus received". The information is send using transfer capabilities like SMS, MMS, USSD.

The seventh part is the Service Provider Access part (7). The Service Provider Access part (7) receives specific events from a Service Provider (e.g. bonus that increases the Partner/Group Account) or gives the Service Provider the possibility to fetch data for customer care purposes (e.g. status of the group, statistical data like the last events that increases the Partner/Group Account).

The eighth part is the Billing Interface part (8). The Billing Interface part (8) supports the integration in the existing billing infrastructure of the Network Operator, especially in the case of legacy real time rating systems outside of the Partner/Group Account Service implementation (e.g. prepay billing systems of the Network Operator).

The ninth part is the Service Access Control part (9). The Service Access Control part (9) receives the events and parameters of the usage of the basic telecommunication services (e.g. voice calls, SMS, MMS), which have an impact on the value of the Partner/Group Account and is the subject for offer of special prices.

The parts (2), (3), (4), (5), (6), (7), (8) and (9) are linked to the Partner/Group Service Handler part (1) via interfaces (12), (13), (14), (15), (16), (17), (18) and (19) respectively.

The parts (4), (5), (6), (7), (8) and (9) can be linked to external systems via interfaces (41), (51), (61), (71), (81) and (91) respectively. This can be useful for transferring data to and/or from external systems (machine-machine interaction) or for providing access to users of the system parts (man-machine interaction).

It is possible that two or more parts are functionally combined. E.g. the Service Handler part (1) and the Rating part (3) can be combined into a single Service Handler & Rating part. Any combination of parts can be made, as long as the combined functionality of the individual parts is part of the combined parts.

Functional Description of a Preferred Embodiment

Initiation of the "Partner/Group Account Service"

The Service Provider initiates the "Partner/Group Account Service" by defining the service configuration data, like service identification, the basic telecommunication services type "A" which decreases the value of the Partner/Group Account, the basic telecommunication services type "B" which increases the value of the Partner/Group Account and the conditions like rules for the mapping between the telecommunications service parameters and the representation in the partner/group account. The data are stored in a database (21) of the Data part (2).

Initiation of a New Partner/Group Account

A subscriber X who wants to initiate a new Partner/Group Account contacts the User Access part (5) using one of the supported access mechanism of the external interface (51) (e.g. using a dedicated service access number 0800-12345 to access a voice response system or using data access via online interfaces using web or WAP technologies).

The subscriber gets the status of a master of the Partner/Group Account, because he is the first member of the group account. He has to input the number of at least one other subscriber Y of the Service Provider (pre-activation of subscriber Y). The Partner/Group Service Handler part (1) checks the input data and prepares the internal representation of this data, stores them in the Data part (2), calculates general provisioning data and transfers these data to the Provisioning part (4). The Provisioning part (4) translates the data in a way that legacy systems can interpret them and use them for provisioning purposes (for example to prepare data for the HLR trigger provisioning in case of using INAP interfaces at the external interface (91) of the Service Access part (9)).

The Service Provider can charge the subscriber X for the initiation of a new Partner/Group Account. In case of a postpaid subscription of the subscriber X the Partner/Group Service Handler part (1) instructs the Billing Interface part (8) to generate an Event Data Record (EDR), which can be used by the Service Provider for billing purposes. In case of a prepaid subscription the Billing Interface part (8) has to support an interface to the external prepaid account of the subscriber X.

Completion of a New Partner/Group Account

After the initiation of a new Partner/Group Account the subscriber Y has to confirm the partnership in a certain time frame (e.g. one week) using the user access capabilities offered by the User Access part (5). After the confirmation the status of subscriber Y is changed to "active". If the subscriber Y does not confirm the membership, the Partner/Group Service Handler part (1) will delete the subscriber Y from the Partner/Group Account list.

The Service Provider can charge the subscriber for the confirmation of the partnership. In case of a postpaid subscription of the subscriber Y the Partner/Group Service Handler part (1) instructs the Billing Interface part (8) to generate an Event Data Record (EDR), which can be used by the Service Provider for billing purposes. In case of a prepaid subscription the Billing Interface part (8) has to support an interface to the external prepaid account of the subscriber Y.

The Partner/Group Service Handler part (1) instructs the Provisioning part (4) to send out provisioning information for the legacy systems and instructs the User Info part (6) to send out information data about the completion of the Partner/Group Account using one of the transfer mechanisms of the external interface (61), e.g. by Short Messages SMS, Multimedia Messages MMS or USSD messages.

Usage of the Partner/Group Account

The network triggers the basic telecommunication services (e.g. voice calls) of the group members using Intelligent Network principals or other systems like Service Nodes in combination with proprietary interfaces. The Service Access Control part (9) will be involved by the network through the external interface (91) and informs the Partner/Group Service Handler part (1) about these events and transfers the parameters, which are needed for further tasks.

The Partner/Group Service Handler part (1) checks the type of the basic telecommunication services and performs the modifications of the Partner/Group Account and identifies the price of the basic telecommunications service as described in above in the section General.

Modification of the Status of the Service or of Group Members

The master of a Partner/Group Account can pre-activate other subscribers. These subscribers have to confirm the membership by using the User Access part (5) to activate the membership to this group. The Partner/Group Service Handler part (1) checks the maximum of group members as defined during the service initiation by the Service Provider.

The membership can be suspended by the master or by the members themselves. The initiator of the suspension has the possibility to re-activate the membership in a certain time window (e.g. one week). Otherwise the Partner/Group Service Handler part (1) will delete the subscriber user from membership list completely.

The master has the possibility to suspend the whole Partner/Group Account. In this case the Partner/Group Account will be deleted after a certain time frame (e.g. one week) if the master does not recover the Partner/Group Account before end of the time window. The same procedure will start if the master is alone in the group and he will be not able to activated at least one new member in a certain time window.

The invention claimed is:

1. A system for dynamically tariffing and billing a group of users for use of communications services, the system comprising a Service Handler part for controlling the dynamic tariffing and billing, a Data part for storing information, and a Rating part for making calculations, the Service Handler part being linked to the Data part via a first interface and to the Rating part via a second interface,
wherein the Data part is configured to store:
  a list of subscribers that belong to the same group,
  an account value indicating which of one or more tariff rates is to be applied to a communications service used by a subscriber;
  identifiers identifying at least two types of telecommunication services, a first identifier identifying a first type of telecommunication services that decrease the account value when used by any one or more group members, and a second identifier identifying a second type of telecommunication services that increase the account value when used by any one or more group members;
  a rule-set for mapping each unit of a telecommunications service used by any one or more group members to a corresponding account value change unit for increasing or decreasing the account value based on the type of telecommunication service;
the Service Handler part is configured to:
  detect a usage of a telecommunication service by any one or more of the group members;
  retrieve data from the Data part, the data including at least said account value, one or more of said identifiers, and at least a portion of said rule-set;
  send at least a portion of the data and the detected usage to the Rating part for calculating a new account value;
  receive the new account value from the Rating part; and
  send the new account value to the Data part to overwrite the account value with the new account value.

2. The system according to claim 1, wherein the system further comprises a Provisioning part that is linked to the Service Handler part via a third interface, the Provisioning part comprising a first external interface for sending and/or receiving provisioning data to a legacy system.

3. The system according to claim 1, wherein the system further comprises a User Access part that is linked to the Service Handler part via a fourth interface, the User Access part comprising a second external interface for providing access to the system to a subscriber.

4. The system according to claim 1, wherein the system further comprises a User Info part that is linked to the Service Handler part via a fifth interface, the User Info part comprising a third external interface for sending subscription information to a subscriber.

5. The system according to claim 1, wherein the system further comprises a Service Provider Access part that is linked to the Service Handler part via a sixth interface, the Service Provider Access part comprising a fourth external interface for providing access to the system to a service provider.

6. The system according to claim 1, wherein the system further comprises a Billing Interface part that is linked to the Service Handler part via a seventh interface, the Billing Interface part comprising a fifth external interface for sending billing information to a service provider.

7. The system according to claim 1, wherein the system further comprises a Service Access Control part that is linked to the Service Handler part via a eighth interface, the Service Access Control part comprising a sixth external interface for detecting usage of the telecommunication service, and the Service Access Control part is arranged to send detecting information to the Service Handler part.

8. A method for dynamically tariffing and billing a group of users for use of communications services in a system comprising a Service Handler part for controlling the dynamic tariffing and billing, a Data part for storing information, and a Rating part for making calculations, the Service Handler part being linked to the Data part via a first interface and to the Rating part via a second interface, the method comprising the steps of:
  storing in the Data part:
    a list of subscribers that belong to the same group;
    an account value indicating which of one or more tariff rates is to be applied to a communications service used by a subscriber,
    identifiers identifying at least two types of telecommunication services, a first identifier identifying a first type of telecommunication services that decrease the account value when used by any one or more group members, and a second identifier identifying a second type of telecommunication services that increase the account value when used by any one or more group members,
    a rule-set for mapping each unit of a telecommunications service used by any one or more group members to a corresponding account value change unit for increasing or decreasing the account value based on the type of telecommunication service;
  detecting in the Service Handler part a usage of a telecommunication service by any one or more of the group members;
  retrieving in the Service Handler part data from the Data part, including at least said account value, one or more of said identifiers, and at least a portion of said rule-set, and sending at least a portion of the data and the detected usage to the Rating part;
  calculating in the Rating part a new account value;
  receiving in the Service Handler part the new account value from the Rating part;
  sending the new account value from the Service Handler part to the Data part; and
  overwriting the account value with the new account value.

9. The method according to claim 8, wherein
  the system further comprises a Provisioning part that is linked to the Service Handler part via a third interface, the Provisioning part comprising first external interface, and the method further comprising the step of sending and/or receiving provisioning data to a legacy system via the first external interface.

10. The method according to claim 8, wherein
the system further comprises a User Access part that is linked to the Service Handler part via a fourth interface, the User Access part comprising a second external interface, and
the method further comprising the step of providing access to the system to a subscriber via the second external interface.

11. The method according to claim 8, wherein
the system further comprises a User Info part that is linked to the Service Handler part via a fifth interface, the User Info part comprising a third external interface, and
the method further comprising the step of sending subscription information to a subscriber via the third external interface.

12. The method according to claim 8, wherein
the system further comprises a Service Provider Access part that is linked to the Service Handler part via a sixth interface, the Service Provider Access part comprising a fourth external interface, and
the method further comprising the step of providing access to the system to a service provider via the fourth external interface.

13. The method according to claim 8, wherein
the system further comprises a Billing Interface part that is linked to the Service Handler part via a seventh interface, the Billing Interface part comprising a fifth external interface, and
the method further comprising the step of sending billing information to a service provider via the fifth external interface.

14. The method according to claim 8, wherein
the system further comprises a Service Access Control part that is linked to the Service Handler part via a eighth interface, the Service Access Control part comprising a sixth external interface, and
the method further comprising the steps of detecting usage of the telecommunication service via the sixth external interface, and sending detecting information from the Service Access Control part to the Service Handler part.

15. The system according to claim 1, wherein the Service Handler is further configured to apply a first tariff rate for the detected usage of the telecommunication service when the account value is a first value, and apply a second tariff rate for the detected usage when the account value different than the first value.

16. The system according to claim 1, wherein the first value is zero.

17. The method according to claim 8, further comprising the step of:
the Service Handler part applying a first tariff rate for the detected usage of the telecommunication service when the account value is a first value, and applying a second tariff rate for the detected usage when the account value different than the first value.

18. The method according to claim 8, wherein the first value is zero.

* * * * *

UNITED STATES PATENT AND TRADEMARK OFFICE
CERTIFICATE OF CORRECTION

PATENT NO. : 7,606,354 B2
APPLICATION NO. : 10/585840
DATED : October 20, 2009
INVENTOR(S) : Wilhelm Werner Meincke It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Fourteenth Day of December, 2010

David J. Kappos
*Director of the United States Patent and Trademark Office*